(12) United States Patent
Walker et al.

(10) Patent No.: US 8,201,163 B2
(45) Date of Patent: Jun. 12, 2012

(54) INPUT/OUTPUT TRANSACTION MANAGEMENT DURING PLATFORM INITIATION

(75) Inventors: James L. Walker, Cedar Park, TX (US); John J. Hawk, Austin, TX (US); Alok Pant, Cedar Park, TX (US); John Hentosh, Pflugerville, TX (US)

(73) Assignee: Dell Products, LP, Round Rock, TX (US)

( * ) Notice: Subject to any disclaimer, the term of this patent is extended or adjusted under 35 U.S.C. 154(b) by 1000 days.

(21) Appl. No.: 12/173,884

(22) Filed: Jul. 16, 2008

(65) Prior Publication Data

US 2010/0017796 A1    Jan. 21, 2010

(51) Int. Cl.
*G06F 9/445* (2006.01)
*G06F 13/38* (2006.01)

(52) U.S. Cl. ............ 717/174; 717/175; 710/62

(58) Field of Classification Search ......... 717/174; 713/100; 710/62
See application file for complete search history.

(56) References Cited

U.S. PATENT DOCUMENTS

| | | | |
|---|---|---|---|
| 5,715,463 A * | 2/1998 | Merkin | 717/175 |
| 6,567,860 B1 * | 5/2003 | Maxwell et al. | 719/327 |
| 6,848,046 B2 | 1/2005 | Zimmer | |
| 7,310,724 B2 | 12/2007 | Chen et al. | |
| 2002/0169951 A1 * | 11/2002 | Zimmer | 713/100 |
| 2004/0103299 A1 | 5/2004 | Zimmer et al. | |
| 2004/0249920 A1 * | 12/2004 | Ogasawara et al. | 709/223 |
| 2006/0168374 A1 * | 7/2006 | Wray et al. | 710/62 |
| 2007/0250691 A1 | 10/2007 | Cool et al. | |

OTHER PUBLICATIONS

"AMD BIOS and Kernel Developer's Guide for AMD Athlon™ and AMD Opteron™ Processors, Rev. 3.06", Chapter 6 (pp. 167-180), Sep. 2003.
"Intel® 64 and IA-32 Architectures Software Developer's Manual: vol. 3B: System Programming Guide, Part 2", Chapter 24 (pp. 24-1 to 24-40), Nov. 2007.
"Intel® Platform Innovation Framework for EFI Architecture Specification: Draft for Review," Version 0.9, (pp. 1-119) Sep. 16, 2003.

* cited by examiner

*Primary Examiner* — Don Wong
*Assistant Examiner* — Lynda Dinh
(74) *Attorney, Agent, or Firm* — Larson Newman, LLP

(57) ABSTRACT

In a Uniform Extensible Firmware Interface (UEFI) environment, a system management mode (SMM) driver and a non-SMM driver may be installed for the same hardware device. Until the SMM driver is available, the non-SMM driver is configured to conduct input/output (IO) transactions directly with the hardware device. The non-SMM driver can utilize native UEFI services to receive a notification that the SMM driver is available. Upon receiving such notification, (or if the SMM driver was already available before the non-SMM driver), the non-SMM driver is reconfigured to redirect all IO requests to the SMM driver, which then conducts the corresponding IO transactions directly with the hardware device. Redirecting all non-SMM IO requests for a hardware device to the SMM driver for the hardware device limits direct access to the hardware device to only one driver, the SMM driver, thereby facilitating the integrity or atomicity of IO transactions.

14 Claims, 3 Drawing Sheets

US 8,201,163 B2

INPUT/OUTPUT TRANSACTION MANAGEMENT DURING PLATFORM INITIATION

FIELD OF THE DISCLOSURE

This disclosure relates generally to information handling systems, and more particularly to managing input/output (IO) transactions in Extensible Firmware Interface (EFI) and Uniform EFI (UEFI)-based environments.

BACKGROUND

Legacy IBM x86-based processor architectures relied primarily on a basic input/output system (BIOS) to initiate platform hardware and initiate loading of the operating system (OS) for the system. Instigated by certain limitations in the BIOS architecture, original equipment manufacturers (OEMs) developed a new specification, the Extensible Firmware Interface (EFI), and later the Unified EFI (UEFI), for managing the pre-boot environment after the platform is powered on and before the OS is loaded. The UEFI specification (which incorporates the earlier EFI specification) describes a platform initialization (PI) phase, or pre-boot phase, and the interface between the operating system and the system firmware. To this end, the UEFI specification provides guidelines for drivers that provide levels of abstraction from the hardware devices of the system. These abstractions provide other UEFI drivers and applications an interface (referred to as "protocols" in UEFI) to the hardware devices managed by the driver producing the abstraction. As an example, an embedded microcontroller (EC) input/output (IO) driver in accordance with the UEFI specification will be responsible for all IO communication with the EC, which might involve, for example, a set of rules that ensure the host system and the EC remain synchronized. An EC IO transaction thus could begin with a handshake between the host and EC to initiate a transaction, followed by a period of time where the EC is internally executing various commands. The transaction might complete some time later when the EC initiates a handshake signaling completion of the transaction. In this case, it is the responsibility of the EC IO driver to ensure that each transaction with the EC is atomic. In other words, the EC IO driver must make sure every host-to-EC transaction is completed before the next transaction begins.

UEFI breaks platform initialization (PI) into several phases, with the bulk of the platform initialization state spent in the Driver Execution Environment (DXE). As such, the drivers that produce the IO protocols for the hardware devices of the system typically are utilized in the DXE. Further, on many systems, a System Management Mode (SMM) will be initialized and enabled by a DXE application during the DXE. The SMM environment can be designed to mimic the DXE environment. Just like DXE drivers, SMM drivers can be written to produce protocols that provide hardware abstractions. In fact, the same protocol definitions used in DXE can be applied to SMM. Thus, it is possible that, once SMM is initialized, two drivers (one in DXE, one in SMM) that produce the IO protocol for a particular hardware device can exist in the system at the same time. With the SMM initiated, the system may enter SMM at any time and temporarily suspend DXE. If a DXE driver managing a hardware interface is in the middle of an IO transaction at the time the system enters SMM, the transaction is suspended by a processor of the system, whereby the system typically saves the configuration index and data registers of the DXE drivers on entry to SMM and restores them on exit from SMM. Care must be taken to ensure that nothing is executed in SMM that might compromise the integrity of IO transactions initiated in DXE. In the case of the EC IO driver example described above, simply saving and restoring the configuration index and register data may not be sufficient because IO transactions managed by the EC IO driver may involve the EC executing internal instructions for long periods before returning to the host and signaling completion of the transaction. If an SMM event occurs in the middle of a DXE-initiated EC IO transaction, that transaction has a high probability of failure if an SMM driver initiates an EC IO transaction. Accordingly, an improved technique for managing IO transactions in the presence of multiple drivers for a particular hardware device would be advantageous.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

Figure 1:
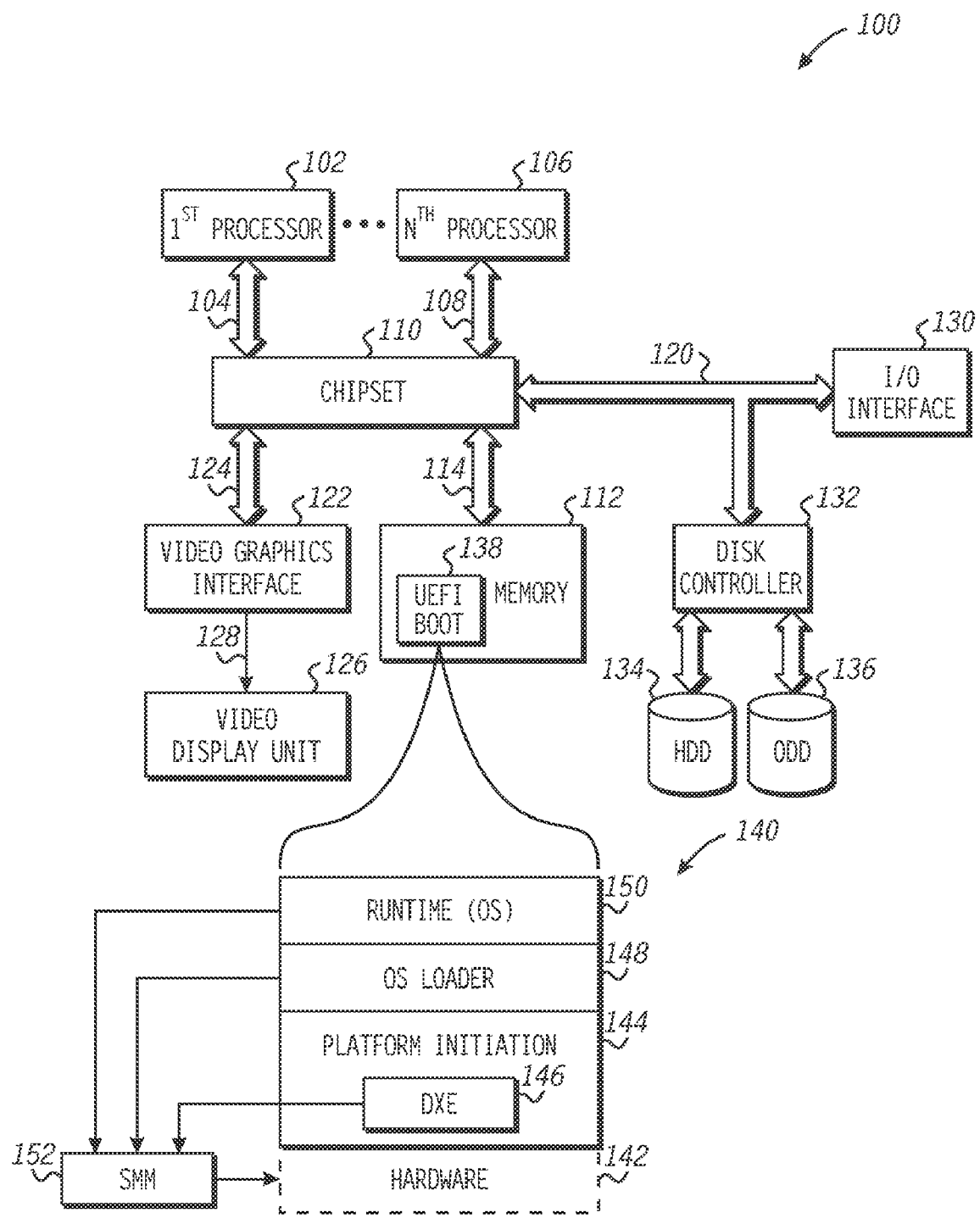
FIG. 1 is a block diagram illustrating an information handling system implementing input/output (IO) transaction management in accordance with at least one embodiment of the present disclosure.
Figure 2:
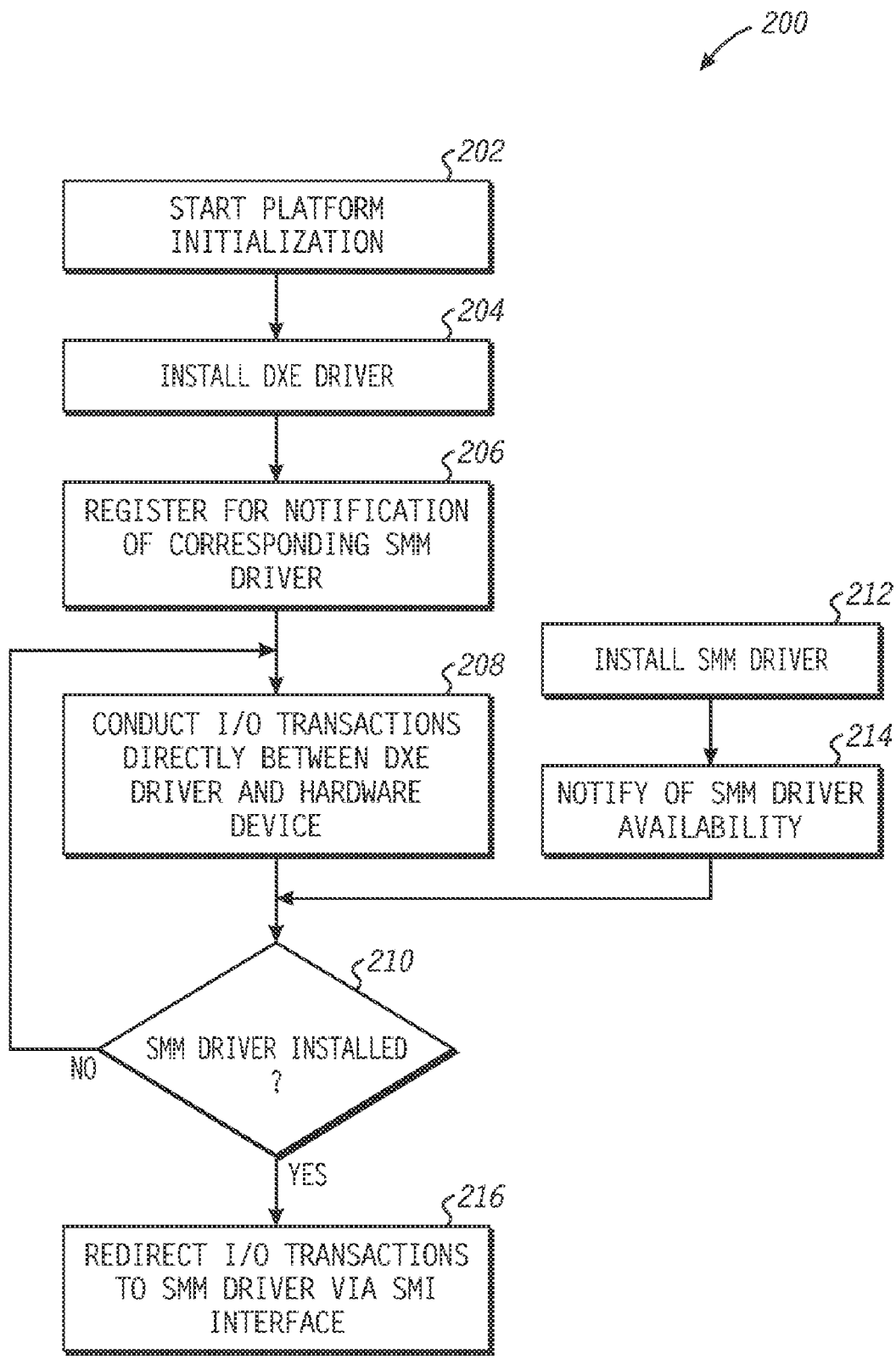
FIG. 2 is a flow diagram illustrating an example method for IO transaction management in accordance with at least one embodiment of the present disclosure.
Figure 3:
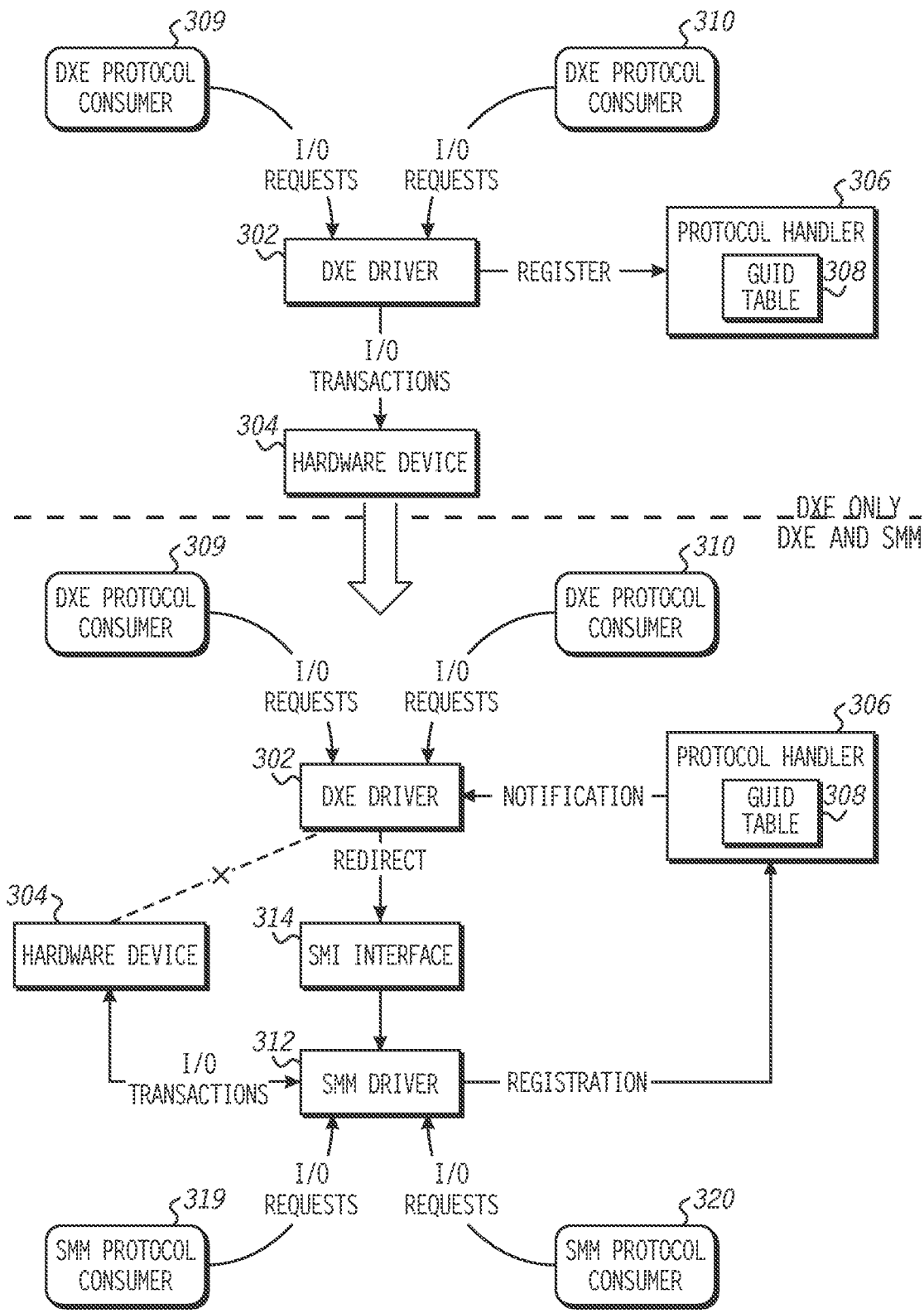
FIG. 3 is a diagram illustrating an example implementation of the method of FIG. 2 in accordance with at least one embodiment of the present disclosure.

FIGS. 1-3 illustrate example techniques for input/output (IO) transaction management in an Extensible Firmware Interface (EFI) or Unified EFI (UEFI)-based environment for an information handling system (e.g., a computer, a personal digital assistance, a smart phone, etc.). In the UEFI-based environment, a SMM driver and a non-SMM driver may be installed for the same hardware device. Until the SMM driver is available, the non-SMM driver can be configured to conduct IO transactions directly with the hardware device. The non-SMM driver can utilize native UEFI services to receive a notification once the SMM driver is available. Upon receiving such notification, (or if the SMM driver was already available before the non-SMM driver), the non-SMM driver can be reconfigured to redirect all IO requests to the SMM driver, which then conducts the corresponding IO transactions represented by the IO requests directly with the hardware device.

Redirecting all non-SMM IO requests for a hardware device to the corresponding SMM driver limits direct access to the hardware device to only one driver, the SMM driver, thereby facilitating the integrity or atomicity of IO transactions to the hardware device.

For ease of illustration, the example IO management techniques are described herein mainly in the context of redirecting IO requests for drivers in the Driver Execution Environment (DXE) of the platform initiation phase to the corresponding driver in the SMM. However, these techniques should not be interpreted as limited to only DXE drivers. Rather, these techniques also can be implemented to redirect IO transactions from other non-SMM drivers, such as runtime (post-platform initialization) drivers. Accordingly, reference to DXE and DXE drivers in the examples described herein can be equivalently applied to the runtime environment and runtime drivers without departing from the scope of the present disclosure.

The UEFI specification incorporates the earlier EFI specification. For purposes of the following disclosure, the term "UEFI" applies to either or both of the EFI specification and the UEFI specification.

An information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

FIG. 1 illustrates a block diagram of an exemplary embodiment of an information handling system 100 in accordance with at least one embodiment of the present disclosure. In one form, the information handling system 100 can be a computer system such as a server. As shown in FIG. 1, the information handling system 100 can include a first physical processor 102 coupled to a first host bus 104 and can further include additional processors generally designated as $n^{th}$ physical processor 106 coupled to a second host bus 108. The first physical processor 102 can be coupled to a chipset 110 via the first host bus 104. Further, the $n^{th}$ physical processor 106 can be coupled to the chipset 110 via the second host bus 108. The chipset 110 can support multiple processors and can allow for simultaneous processing of multiple processors and support the exchange of information within information handling system 100 during multiple processing operations.

According to one aspect, the chipset 110 can be referred to as a memory hub or a memory controller. For example, the chipset 110 can include an Accelerated Hub Architecture (AHA) that uses a dedicated bus to transfer data between first physical processor 102 and the $n^{th}$ physical processor 106. For example, the chipset 110, including an AHA enabled-chipset, can include a memory controller hub and an input/output (I/O) controller hub. As a memory controller hub, the chipset 110 can function to provide access to first physical processor 102 using first bus 104 and $n^{th}$ physical processor 106 using the second host bus 108. The chipset 110 can also provide a memory interface for accessing memory 112 using a memory bus 114. In a particular embodiment, the buses 104, 108, and 114 can be individual buses or part of the same bus. The chipset 110 can also provide bus control and can handle transfers between the buses 104, 108, and 114.

According to another aspect, the chipset 110 can be generally considered an application specific chipset that provides connectivity to various buses, and integrates other system functions. For example, the chipset 110 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 110. The chipset 110 can also be packaged as an application specific integrated circuit (ASIC).

The information handling system 100 can also include a video graphics interface 122 that can be coupled to the chipset 110 using a third host bus 124. In one form, the video graphics interface 122 can be an Accelerated Graphics Port (AGP) interface to display content within a video display unit 126. Other graphics interfaces may also be used. The video graphics interface 122 can provide a video display output 128 to the video display unit 126. The video display unit 126 can include one or more types of video displays such as a flat panel display (FPD) or other type of display device.

The information handling system 100 can also include an I/O interface 130 that can be connected via an I/O bus 120 to the chipset 110. The I/O interface 130 and I/O bus 120 can include industry standard buses or proprietary buses and respective interfaces or controllers. For example, the I/O bus 120 can also include a Peripheral Component Interconnect (PCI) bus or a high speed PCI-Express bus. In one embodiment, a PCI bus can be operated at approximately 66 MHz and a PCI-Express bus can be operated at approximately 128 Mhz. PCI buses and PCI-Express buses can be provided to comply with industry standards for connecting and communicating between various PCI-enabled hardware devices. Other buses can also be provided in association with, or independent of, the I/O bus 120 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 110 can be a chipset employing a Northbridge/Southbridge chipset configuration (not illustrated). For example, a Northbridge portion of the chipset 110 can communicate with the first physical processor 102 and can control interaction with the memory 112, the I/O bus 120 that can be operable as a PCI bus, and activities for the video graphics interface 122. The Northbridge portion can also communicate with the first physical processor 102 using first bus 104 and the second bus 108 coupled to the $n^{th}$ physical processor 106. The chipset 110 can also include a Southbridge portion (not illustrated) of the chipset 110 and can handle I/O functions of the chipset 110. The Southbridge portion can manage the basic forms of I/O such as Universal Serial Bus (USB), serial I/O, audio outputs, Integrated Drive Electronics (IDE), and ISA I/O for the information handling system 100.

The information handling system 100 can further include a disk controller 132 coupled to the I/O bus 120, and connecting one or more internal disk drives such as a hard disk drive (HDD) 134 and an optical disk drive (ODD) 136 such as a Read/Write Compact Disk (R/W CD), a Read/Write Digital Video Disk (R/W DVD), a Read/Write mini-Digital Video Disk (R/W mini-DVD), or other type of optical disk drive.

In a particular embodiment, the information handling system 100 may include a computer readable storage device (e.g., memory 112, HDD 134, ODD 136, etc.) in which one or more sets of executable instructions, e.g. software, can be stored. These executable instructions may embody one or more of the methods or techniques as described herein, and are configured so as to manipulate one or more processors of the information handling system to implement the functionality described herein. In a particular embodiment, the instructions may reside completely, or at least partially, within non-volatile memory, such as flash memory. In at least one embodiment, these executable instructions are implemented as a UEFI-based boot mechanism 138 to manage platform initiation and operating system (OS) initiation upon power-up or restart of the information handling system.

As illustrated by chart 140, the UEFI-based boot mechanism 138 employs a sequence of phases, including a platform initiation (PI) phase 144, an OS loader phase 148, and a runtime environment 150. Typically, a majority of the PI phase 144 is implemented as a driver execution environment (DXE) 146 whereby DXE drivers and DXE applications are installed for the purposes of initializing the hardware 142 of the information handling system 100 and preparing for loading of an OS. The DXE drivers typically interface directly with the underlying hardware 142 by publishing interface protocols that may be used by other DXE drivers and DXE applications (i.e., "consumers" of the published protocol). Upon completion of the PI phase 144, the OS loader phase 148 is utilized to load the OS. Upon completion of the OS load, the runtime environment 150 is enacted and control of the information handling system 100 is transferred to the OS. The runtime environment 150 also may implements drivers that typically interface directly with the underlying hardware 142.

Further, a system management mode (SMM) 152 is initialized and enabled by a DXE application during DXE 146. Once initialized, the SMM 152 can be entered at any point during the PI phase 144, the OS loader phase 148, or during the runtime environment 150 via a system management interrupt (SMI) interface, which can be implemented as either the assertion of a physical pin of the processor or an IO access to a special location associated with the SMI (e.g., port 0B2h).

As with the DXE 146 and the runtime environment 150, the SMM 152 can implement drivers to interface with the hardware 142. Accordingly, it is possible that two drivers (one in DXE 146, one in SMM 152 or one in the runtime environment 150, one in the SMM 152) that produce the IO protocol for a particular device of hardware 142 can exist in the information handling system 100 at the same time. As entering the SMM 152 temporarily suspends the DXE 146 or the runtime environment 150, the potential for coexisting non-SMM and SMM drivers for the same hardware device can introduce the potential for failure in non-SMM-initiated transactions with the hardware device. Accordingly, as described in greater detail below with reference to FIGS. 2 and 3, one or more of the non-SMM drivers utilized in the DXE 146 or the runtime environment 150 are configured so as to redirect IO requests to the corresponding SMM driver once the corresponding SMM driver has been initiated. By redirecting the IO requests to the SMM driver, the non-SMM driver can more fully ensure atomicity of the IO transaction, and therefore reduce or eliminate corruption of the corresponding IO transaction due to an SMM interrupt.

FIG. 2 illustrates a method 200 for managing IO transactions during platform initiation of an information handling system and FIG. 3 illustrates an example implementation of the method 200 in accordance with at least one embodiment of the present disclosure. For ease of illustration, the method 200 is described in the example context of the information handling system 100 of FIG. 1. Further, the method 200 is described with respect to a single DXE driver for a particular hardware device during the DXE 146 (FIG. 1). However, a DXE typically includes the installation of numerous DXE drivers of the DXE, and thus the method 200 can be implemented for some or all of the DXE drivers of the DXE 146 in the manner described herein. Further, while described in the context of the DXE 146, the method 200 can be similarly implemented for other non-SMM environments that can leverage UEFI services, such as runtime drivers installed in the runtime environment 150 (FIG. 1), without departing from the scope of the present disclosure.

At block 202, the information handling system 100 is powered on or otherwise reset, thereby triggering the installation and execution of the UEFI-based boot mechanism 138 (FIG. 1). The boot mechanism 138 enters the platform initiation (PI) phase 144 (FIG. 1) for the information handling system 100. As part of the platform initiation phase 144, at block 204 the boot mechanism 138 installs a DXE driver 302 for a hardware device 304 of the information handling system 100. The hardware device 304 can include any of a variety of hardware devices of the information handling system 100, such as, for example, an embedded microcontroller, a peripheral component interconnect (PCI) controller, a memory controller (e.g., for flash memory), and the like.

As part of the installation process, the DXE driver 302 registers with a UEFI protocol handler 306 at block 206. This registration process includes registering (or "publishing") the globally unique identifier (GUID) of the DXE driver 302, the IO protocols of the DXE driver 302 that direct other DXE drivers or DXE applications on the interface requirements of the DXE driver 302, and further includes registering with the protocol handler 306 to be notified when a corresponding SMM driver that interfaces with the same hardware device 304 is installed. In one embodiment, the corresponding SMM driver is identified by a corresponding GUID. The protocol handler 306 can store the information provided by the DXE driver 302 in its GUID table 308.

Once registered, at block 208 the DXE driver 302 conducts IO transactions directly with the hardware device 304 on behalf of itself and on behalf of IO requests from other DXE drivers or DXE applications (e.g., DXE protocol consumers 306 and 307). To illustrate, because the DXE driver 302 is the only interface permitted to directly transact with the hardware device 304, when the DXE protocol consumer 306 (e.g., a DXE driver) needs to interface with the hardware device 304, the DXE protocol consumer 306 accesses the published IO protocols for the DXE driver 302 from the protocol handler 306 and formats its IO request to the DXE driver 306 based on the published IO protocols.

If the DXE driver 302 determines that it remains the only driver installed for the hardware device 304 (determined at block 210), the DXE driver 302 continues to be configured so as to conduct IO transactions directly with the hardware device 304. However, at some point during the DXE phase, the SMM 152 (FIG. 1) is initialized, and thus a SMM driver 310 is installed for the hardware device 304 at block 212. As with the DXE driver 302, the SMM driver 310 registers with the protocol handler 306, including registering the GUID of the SMM driver 310, the IO protocols of the SMM driver 310, etc. The protocol handler 306, recognizing that the DXE driver 302 has registered to be notified when the SMM driver 310 has been installed (e.g., via the GUID of the SMM driver 310), notifies the DXE driver 302 that the SMM driver 310 has been installed at block 214.

In response to determining that the SMM driver 310 is available (e.g., by being notified of the installation of the SMM driver 310), at block 216 the DXE driver 302 is reconfigured to cease conducting IO transactions directly with the hardware device 304 and to redirect any IO requests it receives to the SMM driver 312. In one embodiment, the DXE driver 302 redirects the IO requests via a system management interrupt (SMI) interface 314 in a manner that is transparent to the DXE protocol consumers 309 and 310. To illustrate, upon receipt of an IO request from one of the DXE protocol consumers 309 or 310, the DXE driver 302 stores pertinent data from the IO request in a set of specified registers and then writes a particular value associated with the SMM driver 312 to a special location associated with the SMI interface 314 (e.g., port 0B2h). In response to detecting an access to the special location, the processor(s) of the information handling system 100 enter the SMM 152 and initiate execution of an interrupt handler (one embodiment of the SMI interface 314) associated with the particular value written to the special location by the DXE driver 302. The interrupt handler then interfaces with the SMM driver 312 based on its published protocols (e.g., by passing to the SMM driver 312 the pertinent data stored in the set of specified registers) to initiate the IO transaction represented by the IO request. Any data from the IO transaction to be returned to the source of the IO request can be written to a set of registers or a specified location in memory by the SMM driver 312 before SMM is exited. The DXE driver 302 then can access the set of registers and provide the stored data to the source of the IO requests, or the DXE driver or application that generated the IO request can access the registers directly to obtain the resulting data.

As the DXE driver 302 is configured to redirect all IO requests on the DXE side to the SMM driver 312, at block 218 the SMM driver 312 conducts IO transactions directly with the hardware device 304 on behalf of itself, the DXE driver 302, the DXE protocol consumers 309 and 310, as well as other SMM drivers and SMM applications (e.g., SMM protocol consumers 319 and 320). The redirection of DXE-based IO requests to the SMM driver 312 ensures that only one driver, the SMM driver 312, directly interfaces with the hardware device 304, and thereby eliminates the possibility that an IO transaction will be interrupted by entry into SMM and thereby potentially corrupting the IO transaction. That is, the redirection of non-SMM IO requests to the SMM driver permits non-SMM IO requests to maintain their integrity or atomicity.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
installing, at an information handling system, a non-system management mode (non SMM) driver associated with a hardware device; and in response to determining an SMM driver associated with the hardware device is available at the information handling system:
redirecting an input/output (IO) request from the non-SMM driver to the SMM driver;
conducting an IO transaction represented by the IO request directly with the hardware device via the SMM driver and
conducting the IO transaction directly with the hardware device via the non-SMM driver in response to determining the SMM driver is not available at the information handling system;
wherein redirecting the IO transaction comprises:
generating, via the non-SMM driver, a system management interrupt (SMI)
associated with the SMM driver; and
configuring the SMM driver to conduct the IO transaction in response to the SMI.

2. The method of claim 1, wherein:
installing the non-SMM driver comprises registering the non-SMM driver with a Unified Extensible Firmware Interface (UEFI) protocol handler to be notified when the SMM driver registers with the UEFI protocol handler; and
determining the SMM driver is available at the information handling system comprises receiving notification from the UEFI protocol handler that the SMM driver has been registered with the UEFI protocol handler.

3. The method of claim 1, wherein the non-SMM driver comprises a driver execution environment (DXE) driver.

4. The method of claim 1, wherein the non-SMM driver comprises a runtime environment driver.

5. An information handling system comprising:
a hardware device;
a processor; and
memory storing executable instructions configured to manipulate the processor to: install a non-system management mode (non-SMM) driver associated with a hardware device; and in response to determining an SMM driver associated with the hardware device is available at the information handling system:
redirect an input/output (IO) request from the non-SMM driver to the SMM driver;
conduct an IO transaction represented by the IO request directly with the hardware device via the SMM driver and conduct the IO transaction directly with the hardware device via the non-SMM driver in response to determining the SMM driver is not available at the information handling system;
wherein the executable instructions configured to manipulate the processor to redirect the IO transaction comprising executable instructions configured to manipulate the processor to:
generate, via the non-SMM driver, a system management interrupt (SMI) associated with the SMM driver; and
configure the SMM driver to conduct the IO transaction in response to the SMI.

6. The information handling system of claim 5, wherein:
the executable instructions configured to manipulate the processor to install the non-SMM driver comprise executable instructions configured to manipulate the processor to register the non-SMM driver with a Unified Extensible Firmware Interface (UEFI) protocol handler to be notified when the SMM driver registers with the UEFI protocol handler; and the executable instructions configured to manipulate the processor to determine the SMM driver is available at the information handling system comprise executable instructions configured to manipulate the processor to receive notification from the UEFI protocol handler that the SMM driver has been registered with the UEFI protocol handler.

7. The information handling system of claim 5, wherein the non-SMM driver comprises a driver execution environment (DXE) driver.

8. The information handling system of claim 5, wherein the non-SMM driver comprises a runtime environment driver.

9. The information handling system of claim 5, wherein the hardware device comprises an embedded microcontroller.

10. The information handling system of claim 5, wherein the hardware device comprises a memory controller.

11. A computer readable memory embodying executable instructions configured to manipulate a processor of an information handling system to:

install a non-system management mode (non-SMM) driver associated with a hardware device; and in response to determining an SMM driver associated with the hardware device is available at the information handling system:

redirect an input/output (IO) request from the non-SMM driver to the SMM driver; conduct an IO transaction represented by the IO request directly with the hardware device via the SMM driver and conduct the IO transaction directly with the hardware device via the non-SMM driver in response to determining the SMM driver is not available at the information handling system;

wherein redirect the IO transaction comprising executable instructions configured to manipulate the processor to:

generate, via the non-SMM driver, a system management interrupt (SMI) associated with the SMM driver; and configure the SMM driver to conduct the IO transaction in response to the SMI.

12. The computer readable memory of claim 11, wherein:

the executable instructions configured to manipulate the processor to install the non-SMM driver comprise executable instructions configured to manipulate the processor to register the non-SMM driver with a Unified Extensible Firmware Interface (UEFI) protocol handler to be notified when the SMM driver registers with the UEFI protocol handler; and the executable instructions configured to manipulate the processor to determine the SMM driver is available at the information handling system comprise executable instructions configured to manipulate the processor to receive notification from the UEFI protocol handler that the SMM driver has been registered with the UEFI protocol handler.

13. The computer readable memory of claim 11, wherein the non-SMM driver comprises a driver execution environment (DXE) driver.

14. The computer readable memory of claim 11, wherein the non-SMM driver comprises a runtime environment driver.

\* \* \* \* \*